United States Patent
Moussa et al.

(10) Patent No.: US 8,724,226 B2
(45) Date of Patent: May 13, 2014

(54) HEAD-UP DISPLAY SYSTEM

(75) Inventors: Hassan Moussa, Illkirch (FR); Idriss El Hafidi, Illkirch-Graffenstaden (FR)

(73) Assignees: Delphi Technologies, Inc., Troy, MI (US); Universite de Strasbourg, Strasbourg (FR)

( * ) Notice: Subject to any disclaimer, the term of this patent is extended or adjusted under 35 U.S.C. 154(b) by 0 days.

(21) Appl. No.: 13/697,965

(22) PCT Filed: May 10, 2011

(86) PCT No.: PCT/EP2011/057472
§ 371 (c)(1),
(2), (4) Date: Dec. 10, 2012

(87) PCT Pub. No.: WO2011/144487
PCT Pub. Date: Nov. 24, 2011

(65) Prior Publication Data
US 2013/0076791 A1    Mar. 28, 2013

(30) Foreign Application Priority Data
May 20, 2010 (FR) .................................... 10 53935

(51) Int. Cl.
*G02B 27/14* (2006.01)
*G09G 5/00* (2006.01)

(52) U.S. Cl.
USPC ............................................ 359/631; 345/7

(58) Field of Classification Search
USPC ............... 359/9, 13, 17, 631, 618, 629, 630; 345/7; 349/6, 11; 353/11, 38; 438/32
See application file for complete search history.

(56) References Cited

U.S. PATENT DOCUMENTS

| 3,892,474 A | 7/1975 | Nilsson |
| 4,261,635 A | 4/1981 | Freeman |
| 4,919,517 A | 4/1990 | Jost et al. |
| 5,053,755 A | 10/1991 | Smith et al. |
| 7,777,960 B2 * | 8/2010 | Freeman ...................... 359/630 |
| 2008/0225391 A1 | 9/2008 | Walter et al. |

FOREIGN PATENT DOCUMENTS

| EP | 0312094 | 4/1989 |
| EP | 0398346 | 11/1990 |
| EP | 0710866 | 5/1996 |
| FR | 2208105 | 6/1974 |
| FR | 2722582 | 1/1996 |

OTHER PUBLICATIONS

Anonymous: "Image source for an analog head up display", Research Disclosure, Mason Publications, Hampshire, GB, vol. 322, No. 21, Feb. 1, 1991, XP007116029, ISSN: 0374-4353.
International Search Report dated Oct. 29, 2011.

* cited by examiner

*Primary Examiner* — Tuyen Tra
(74) *Attorney, Agent, or Firm* — Lawrence D. Hazelton

(57) ABSTRACT

Independent optical unit for head-up display system for motor vehicle, intended for the display in the field of view of the driver of a virtual image obtained from an object image coming from a projector, including a first optical component reflecting the incident light rays emanating from the projector towards a second optical component placed in the field of view of the driver for the positioning of a final virtual image, means being provided for the adjustment of their relative position.

12 Claims, 4 Drawing Sheets

HEAD-UP DISPLAY SYSTEM

CROSS-REFERENCE TO RELATED APPLICATION

This application claims the benefit under 35 U.S.C. §371 of published PCT Patent Application Number PCT/EP 2011/057472, filed May 10, 2011, claiming priority to French patent application number FR1053935 filed on May 20, 2010, and published as WO2011/144487 on Nov. 24, 2011, the entire contents of which is hereby incorporated by reference herein.

TECHNICAL FIELD OF INVENTION

The present invention relates to the field of head-up display systems for motor vehicles, intended for the display of virtual images in the field of view of the driver. These systems permit display of operating parameters of the vehicle obtained from a backlit object image on the display of a projector placed in the passenger space of the vehicle.

BACKGROUND OF INVENTION

The majority of existing head-up display systems are inserted in vehicles at manufacture, i.e. they are mounted and adjusted at the time of their construction. In this case, the vehicles are designed for this insertion to be performed under the best conditions in particular of positioning relative to the field of view of the driver. The adjustments, sometimes complicated, are performed at manufacture, on construction of the vehicle.

Configurations to be installed a posteriori as independent equipment insertable where necessary by the user also exist, but they are in the majority of cases very difficult to adjust, and/or not easily integratable in the vehicles in particular because the places in which they can be inserted are very limited.

One of the main reasons for these difficulties is associated with the fact that these systems include an optical component that is placed in the field of view of the user. The component provides optical functions including the correct positioning of the virtual image in this same field of view, functions of which the implementation with the technologies employed up until the present time causes the component to exhibit an insufficient degree of transparency with regard to the safety standards in force.

Such a system is intended to provide an additional functionality to improve the use of the vehicle, but must not at the same time remove a comfort element, detrimental moreover to driving safety.

In general, in the existing systems, the component placed in the field of view manages the projection depth, a sensitive parameter as it is linked to the integration of driving parameters of the vehicle in the environment that is the object of the visual attention of the driver. The depth is generally considered as having to be matched to the dimensions of the vehicle and the real scene (its value is generally greater than 1.80 m).

Similarly, the virtual image projected in the field of view of the driver should have a sufficient size and luminance, a compromise however having to be found to avoid disturbing the attention of the driver to what is happening around the vehicle while clearly displaying information useful to driving. Lastly, the positioning of the virtual image must be controllable in a vertical plane. These parameters together must make the reading of the virtual image comfortable both in relation to the real environment and in relation to the shape of the vehicle.

The head-up display systems currently available on the equipment market have a certain number of limitations in this respect mainly due to their technology. Thus, as they are based on holograms created for example from photosensitive materials or on semi-reflective minors, which is the case for the majority of currently available solutions, the levels of transparency obtained are low and in practice result in degrading of the field of view of the driver.

This level of transparency is in particular much lower than the minimum values required by the regulations associated with windscreens.

Secondarily, the level of the luminance that is obtained by means of these solutions is limited, also due to the insufficient transparency, which degrades the readability of the virtual image in practice.

SUMMARY OF THE INVENTION

The present invention remedies these disadvantages, by proposing an optical unit designed to manage optimally the parameters necessary to the implementation of the head-up display, easily adjustable moreover without special skills The proposed system is lastly easy to manufacture, and mass-producible industrially at costs suited to this type of market. The subsequent insertion in motor vehicles, where necessary by the driver himself, is facilitated by the compactness of the optical unit, which is designed to fit all the types of projection systems meeting the standards in force.

This independent optical unit, intended for the display in the field of view of the driver of a virtual image obtained from an object image coming from a projector, includes a first optical component reflecting the incident light rays emanating from the projector towards a second optical component placed in the field of view of the driver for the positioning of a final virtual image. Means for adjustment of their relative positions are provided in the unit of the invention.

This is mainly characterized by the fact that the first component performs an enlargement of the object image and increases its depth of field and the second component positions the virtual image in a vertical plane, the said second component being made of a transparent material of lenticular shape, one of the faces of which is flat and includes a diffraction grating for positioning of the final virtual image, the said shape and the diffraction grating being designed not to deform the exterior scene visible by the driver through the second component.

More precisely, the said second component is made of transparent material of lenticular shape, the face of which on the driver's side is flat and includes a diffraction grating for positioning of the final virtual image comprising at least one set of straight lines which are parallel and equidistant at a pitch of between 0.4 µm and 1 µm, the ratio of width of the line and of the pitch being between 0.3 and 0.6, so as to allow the positioning of the virtual image in a vertical plane without producing for the driver a deformation of the exterior scene visible through the second component.

This or these diffraction grating(s), with the above values, allow the level of transparency of the second component, provided at manufacture in a very transparent material of the PMMA, PC or PET type, not to be reduced.

On its face opposite to the driver, the second component presents a surface that is flat or configured with a curvature designed to produce an additional enlargement of the object image, the radius of curvature being sufficiently large not to deform the exterior scene visible to the driver through the second component.

To prevent the distortion of the exterior image as much as possible, the convexity must have, in practice, a very large radius of curvature, which means in other words that this surface is very slightly curved. This curvature is provided to enlarge the image by a factor g2.

In practice, the face opposite to the driver has a convexity having a radius of curvature greater than 5 m.

In other words, the component that is placed in the field of view of the driver produces no distortion of the exterior scene, but on the contrary performs its functions and contributes in particular to the correct positioning of a virtual image of sufficient size and luminance without causing optical perturbations in the rays coming from outside. The positioning of the virtual image is effected at a certain distance and in a vertical plane situated in the field of view of the driver, and the second component allows a height adjustment of this image i.e. a displacement in the said vertical plane.

The main functions of enlargement and increasing the depth of field are undertaken by the first component, which does not appear in the field of view of the driver and can consequently be subject to optical treatments optimizing these functions without any transparency requirement being imposed.

In the systems of the prior art, these functions are undertaken by the component situated in the field of view of the driver, leading to a noticeable reduction in its transparency, which is however necessary and even required by regulation. This is also the case for the systems using the reflection of the windscreen as combiner for the display of the virtual image, which have the disadvantage of low reflectivity requiring powerful lighting sources and for which the projection of the virtual image at long-distance requires the use of a plurality of optical components in the projection module.

The first component is in fact a reflector of which the face receiving the incident light rays is concave. The concavity is for example defined by a radius of curvature imparting a first enlargement to the object image of the projector.

This concavity can result from a parabolic, spherical, elliptical etc . . . surface. The depth of field that results from the first component is greater than the distance, necessarily limited, which separates the projector from the said first component.

The concave surface includes superimposed selective reflection layers having indices of refraction selectively reflecting the wavelength or wavelengths of the light beam with well-determined polarization coming from the projector and emanating from at least one light-emitting light source, which can be a monochromatic laser source or electroluminescent diodes (LED).

Alternatively, the concave surface can include only one reflection layer.

The layers with selective reflectivity are intended to reflect only the rays corresponding to the object image, and to "filter" de facto the light rays emanating from the near environment. In practice, the selective layer or layers are superimposed on the concave surface, in number and thicknesses suited to the color or colors of the incident light rays.

An incident beam with a broad spectral band is indeed propagated through the superimposed layers, as the reflection at the level of the different diopters is effected only for the beams having a very precise phase. The reflected beams having the same phase add up and are consolidated.

The level of reflection is then very high for the operating wavelengths of the head-up display system, while for the ambient light, i.e. not coming from the projector, no structured reflection occurs.

The second component, positioning the enlarged image in the field of view of the driver, in fact performs a residual enlargement much less than the level of enlargement of the primary vertical image emanating from the first component. This is not its main function, and it must above all be performed without prejudicing the main objective of transparency and faithful rendering of the exterior image.

Its curvature is consequently sufficiently small not to distort the reality of the panorama surrounding the vehicle, as it can be seen by the driver through the second optical component.

The diffraction grating which its flat face includes can be multiplexed, i.e. present a plurality of sets of equidistant parallel straight lines having different pitches intended for the positioning of virtual images of different wavelengths, corresponding for example to the primary colors.

To improve the potentialities of the head-up display, the display of information of different colors can indeed be provided, in order to position different colored motifs of the final virtual image in a precise zone with a given slant (corresponding to the height in the vertical plane).

This image is then placed in the field of view of the driver at a depth greater than the depth of positioning of the intermediate virtual image obtained via the first component, and its enlargement is equal to the multiplication of the two enlargement factors.

The manufacture of such a component is performed without difficulty, for example by injection molding, since it is then sufficient to provide the flat face of the mound with a straight line in relief by any suitable technique and to duplicate it by translation at calculated intervals. Such a mound, the opposite face of which is given the required curvature, permits mass production of the second optical component at low cost.

In accordance with an alternative embodiment, it is possible to provide a mound the flat face of which includes no line, these being then obtained automatically by any process permitting correct drawing of the lines on the flat surface.

The existence of a solution for orientation of the beams as simple as a diffraction grating of straight lines ensures the main objective of the invention, namely that the light beams coming from the environment pass through the second component substantially without modifications. It consequently remains transparent, guaranteeing that the environment of the vehicle remains perfectly visible to the driver.

In accordance with the invention, means for adjustment of the relative position of the two components permit pivoting of the second component relative to the first about an axis perpendicular to the plane containing the optical axes of the components.

By causing variation of the angle between the two components, the vertical position of the final vertical image can be more finely adjusted, which in particular allows it to be suited to the position and the height of the driver.

Moreover, the said adjustment means can allow a translatory displacement of the second component in a direction parallel with the normal passing through the vertex of the concave surface of the first component.

Such a displacement allows variation of the distance of the final virtual image relative to the optical unit, and consequently relative to the driver, as will be explained in more detail below. This translatory displacement of the second component can be performed by motorized drive means or manually.

These adjustment possibilities constitute a major advantage for the head-up viewing functionality.

Among the other main advantages of the invention, it is to be stressed that the two components can be manufactured very simply of plastics, the second being in addition in one piece, i.e. including a single substrate. They are consequently easily industrially producible, due to the possibility of their mass replication.

The second component being completely transparent, it is perfectly suited to head-up viewing, in which application the level of transparency required is very high and governed by regulation. As a result of the distribution proper to the invention of the functions between the two components, its form and its transparency are not encumbered by the functions that it undertakes.

In particular, the curved face is only very slightly so since the enlargement function arises principally from the first optical component. This can then include at least one reflective layer, the opacification which results therefrom no longer being a problem. Under a hypothesis with a plurality of layers, these are preferably selective thereby removing the need for any mechanical protective mask intended to minimize the reflection of the parasitic light rays (sun et alia).

The optical unit of the invention can include a support able to be inserted on or adjacent to a vehicle dashboard, the first and the second components being arranged on the support and the adjustment means permitting modification of the relative position of at least one of the two components relative to the support.

The invention furthermore relates to a head-up display system that includes an optical unit such as described above and a projection device that is arranged so that the light rays of its display are emitted towards the first component.

In accordance with a first alternative embodiment, the user of the vehicle can buy an optical unit in accordance with the invention and associate it with a conventional nomadic projector for example fixed to the ceiling of the vehicle, the unit of the invention being inserted at the dashboard.

In accordance with a second alternative embodiment, the second component extending in a plane generally at right angles to the direction of the axis of view of the driver, at one end of the support situated on the side of the driver, the projection device is arranged on the support, between the first and the second components.

Under this hypothesis, the optical unit of the invention concentrates all the functions, and one single insertion at the dashboard is sufficient to obtain a complete and functional head-up display system.

Preferably, the projection device is then arranged under the second component. In both cases, the invention offers adjustment possibilities that are easy to implement.

BRIEF DESCRIPTION OF DRAWINGS

The invention will now be described in more detail, with reference to the attached figures, provided as a non-limiting example, for which.

DETAILED DESCRIPTION

Figure 1:
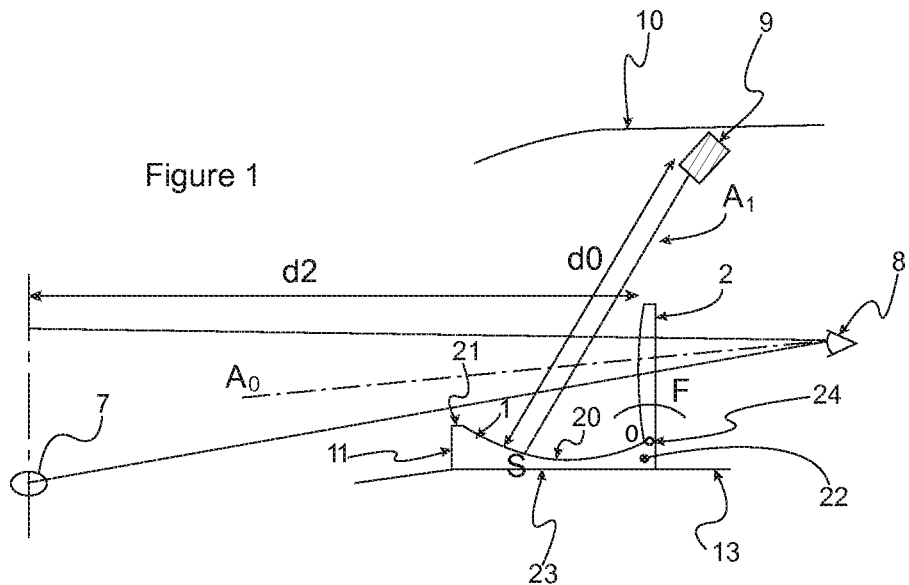
FIG. 1 shows diagrammatically the integration of an optical unit in accordance with the invention in a vehicle provided with a projection device arranged at the ceiling of the vehicle.

With reference to FIG. 1, the optical unit of the invention, for example fixed on a vehicle dashboard (13), includes two components (1, 2) which have the function of enlarging and positioning in the field of view of the driver an object image (3) coming from a conventional projection device (9) fixed in this case to the ceiling (10) and displaying the said image on an output display for example back-lit by substantially monochromatic laser beams or by LEDs.

In accordance with one possibility, the unit of the invention is based on a support (11), which is assimilated in FIG. 1 with the first component (1), which is more precisely integrated in a concave hollow (20) of the support (11) including two opposed rims (21) and (22). The component (1) at least partially gives the hollow (20) its concavity. The second component (2) is mounted on the rim (22). For reasons of relative positioning of the nomadic projector (9), taking particularly into consideration the particular geometry of a vehicle passenger space and the distances which are available in it for an optical system such as a head-up display system, the vertex S of the concavity of the first component (1), at the intersection of the optical axis $A_1$ with the surface corresponding to the geometry of the component (1), is offset towards the rim (21) as shown in FIG. 1, to take into account the slant of the incident optical rays.

The support (11) includes a flat base (23) or following the shape of a vehicle dashboard (13), allowing it to be easily placed and then fixed on such a dashboard (13) or in a housing provided for this purpose in the said dashboard (13). The positioning of the support (11) must be such that the second component (2) crosses the optical axis ($A_0$) of the view of the driver (8), without visually degrading the exterior scene such as it appears to the said driver (8).

The primary or intermediate virtual image (4) (see FIG. 2) enlarged by the first component (1), which also creates a first depth of field d1 greater than the distance d0 separating the projector (9) from the first component (1), is reflected towards the second component (2) (see FIG. 3), the function of which is to position a final virtual image (7) correctly relative to a driver (8), i.e. on the one hand at a second depth of field d2 preferably still greater than d1, on the other with a particular downward angle relative to the driver (height positioning in a vertical plane).

Figure 2:
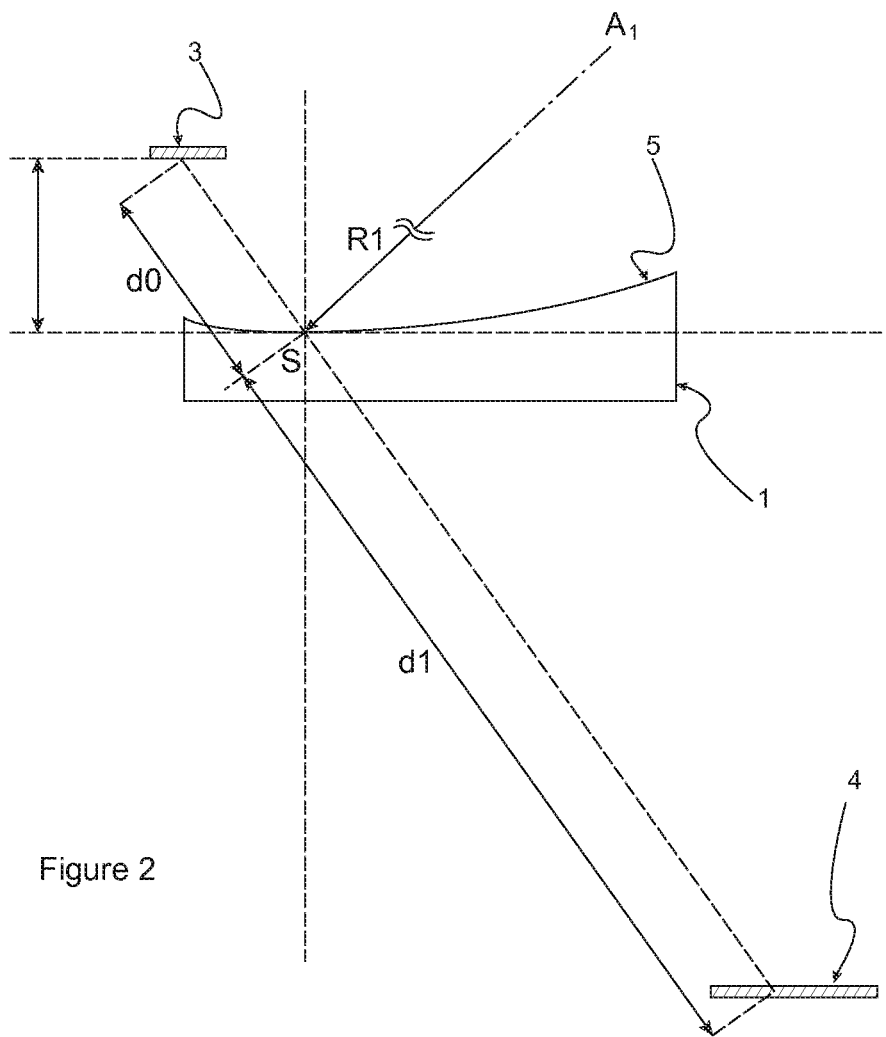
FIG. 2 shows the optical operation of the first component.

The first component (1), shown in isolation in FIG. 2, therefore creates from the object image (3) leaving the projector (9) a primary virtual image (4) at a distance d1 from the vertex S of the concave reflector of radius R1. The radius of curvature of this reflector (1) is so calculated that the distance d1 is greater than the distance d0 separating the object image (3) from the said vertex. It is moreover also so calculated that the distance d0 always remains within the limits of the distances available in the passenger space of the vehicle, and in particular of the distance between the module of the roof head able to receive the projector and the left part of the dashboard facing the driver.

Thus, the calculation of the focal length f, and therefore of the radius R1, can be obtained from the distances d0 and d1. For a concave mirror, the choice of the focal length f indeed depends on the distance d0 between the projector (9) and the mirror of the first component (1) and on the distance d1 of the primary virtual image (4) required using the relationship:

$$1/f = 1/d0 + 1/d1 \qquad \text{Eq. 1}$$

The radius of curvature R1 of the concave mirror of the first component (1) is linked to the focal length by the relationship:

$$f = R1/2 \qquad \text{Eq. 2}$$

Figure 3:
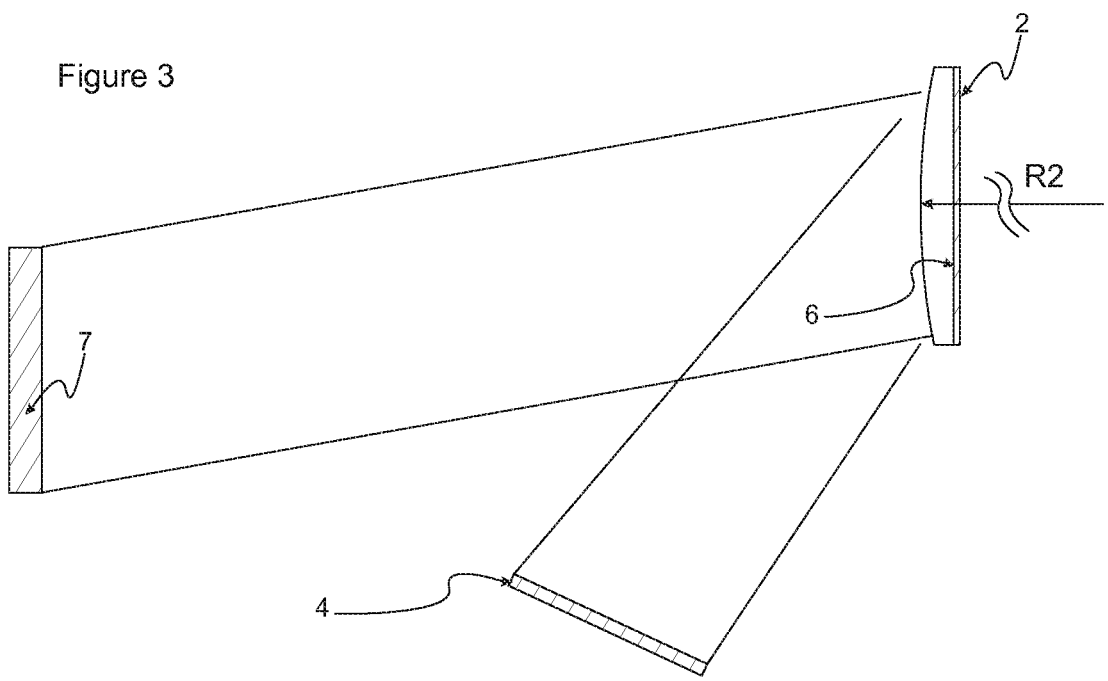
FIG. 3 shows the optical operation of the second component.

Moreover the reflector, which can be spherical, parabolic, elliptical or other . . . must position the primary virtual image (4) on the opposite side from the object image (3), and the reflected rays must be directed towards the second component (2), as shown in FIG. 3. A non-selective reflective layer or a plurality of selective reflective layers (5) is arranged on the surface of the reflector.

The component (1) not being placed in the field of view of the driver, it can be made opaque, depending on the manufacturing requirements and the material used.

The component (2), as it is shown in FIG. 3, is on the contrary a necessarily transparent element, provided with a flat face and a face with a large radius of curvature R2 (R2>>R1).

The small curvature allows an additional level of enlargement g2 to be obtained which is not prejudicial to the faithful rendering of the environment for the driver (8). At least one diffraction grating (6) of straight lines separated by a uniform pitch, or a multiplexing of such diffraction gratings (6) under the hypothesis of a plurality of colors to be displayed, is formed on the flat face of the component (2). As mentioned above, the said multiplexing permits interaction with rays reflected selectively by the first component (1) the wavelengths of which are different, for example selected centered on the colors red, green and blue.

This diffraction grating (6) permits positioning of the final virtual image with a given slant relative to the driver (8), i.e. causing variation of it in a vertical plane in front of the windscreen of the vehicle, obviously visible above the bonnet.

The final virtual image (7) is then placed in the field of view of the driver at a depth greater than that of the primary virtual image, at an enlargement equal to g1×g2, and it does not obstruct the driver in his general view of the surrounding scenery.

It is to be noted that by causing the angle of the second component (2) to vary relatively to the first component (1) using adjustment means (24), for example by rotation about an axis (O) as indicated diagrammatically by the curved double arrow (F) of FIG. 1, the vertical positioning of the final virtual image (7) can be adjusted. The adjustment means (24) contribute to the fixing one to the other of the components (1, 2) allow this pivoting.

Figure 4:
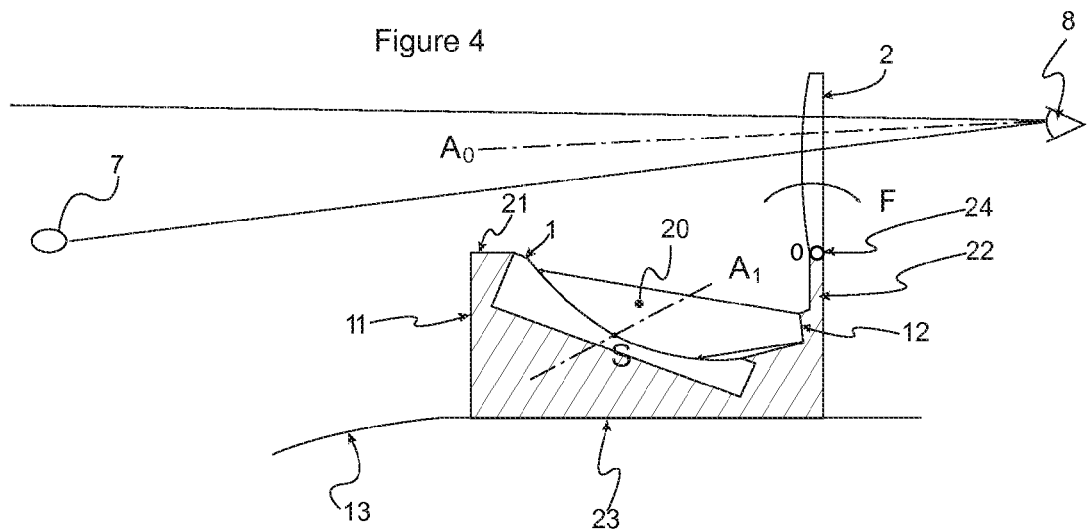
FIG. 4 shows an alternative embodiment of the optical unit of the invention with a projection device integrated in a support of the two components.

The projector (12) can alternatively (see FIG. 4) be integrated in the support (11) in which the first component (1) is fixed, and to which the second component (2) is connected. In this case, the projector (12) from which the incident beam comes is situated in the immediate proximity of the first component (1).

The support (11) includes a hollow (20) more marked than in the configuration of FIG. 1, allowing integration of a projector (12) at the base of the rim (22) formed as a promontory for the adjustment means (24) of the position of the second component (2), so that the projector (12) emits its optical rays in the hollow (20), towards a component (1) substantially more slanted towards and as far as the rim (21), which is in fact facing the said rays.

This support (11) can also be placed and then fixed on a dashboard (13), or be integrated in it in a housing provided for this purpose. The adjustment means (24) are then such that, in addition to a pivoting adjustment in the direction of the arrow F and about the axis (O), the second component (2) can also be adjustable, manually or in motorized manner, by translatory displacements (D) in a direction substantially parallel with the optical axis $A_1$ passing through the vertex S of the concave reflector of radius R1 forming the first component (1). This is what is shown in FIG. 5.

Figure 6:
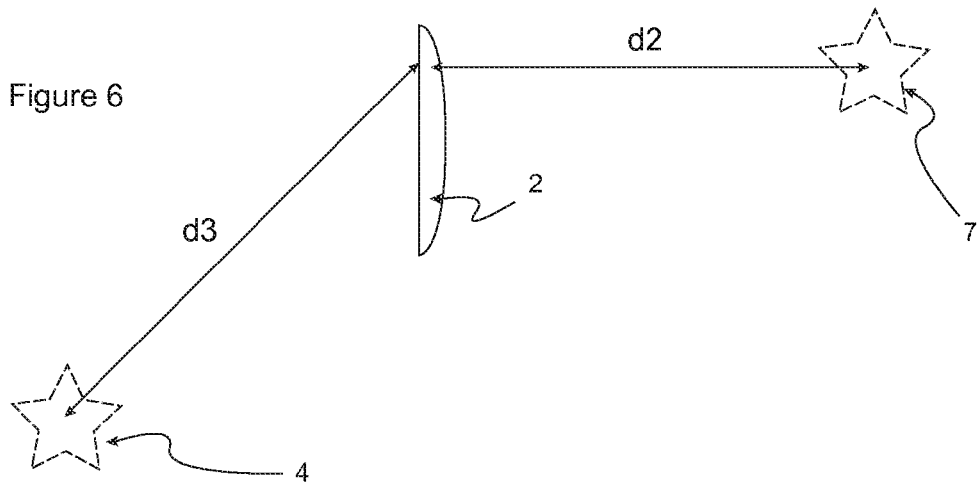
FIGS. 6 and 7 explain the optical operation of the system permitting variation of the distance separating the virtual image from the driver.
Figure 7:
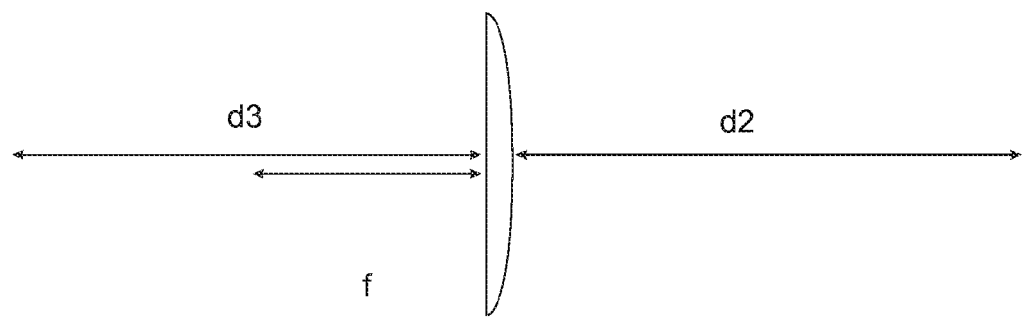

Two distinct positions of the second component (2) then lead to displacement of the final virtual image (7) into two equally distinct positions. The explanation is given in FIGS. 6 and 7, which optically model the general behavior of the system, while however reversing the position of the component (2) to improve the readability of FIG. 7. The distance d3 separates the intermediate virtual image (4) obtained via the first optical component (see FIGS. 2 and 3) from the second component (2). Optically, the diagrams of FIGS. 6 and 7 are equivalent, and from FIG. 7 can be drawn the equation:

$$d2 = (d3 \ast f)/(d3 - f) \qquad \text{Eq. 3}$$

Figure 5:
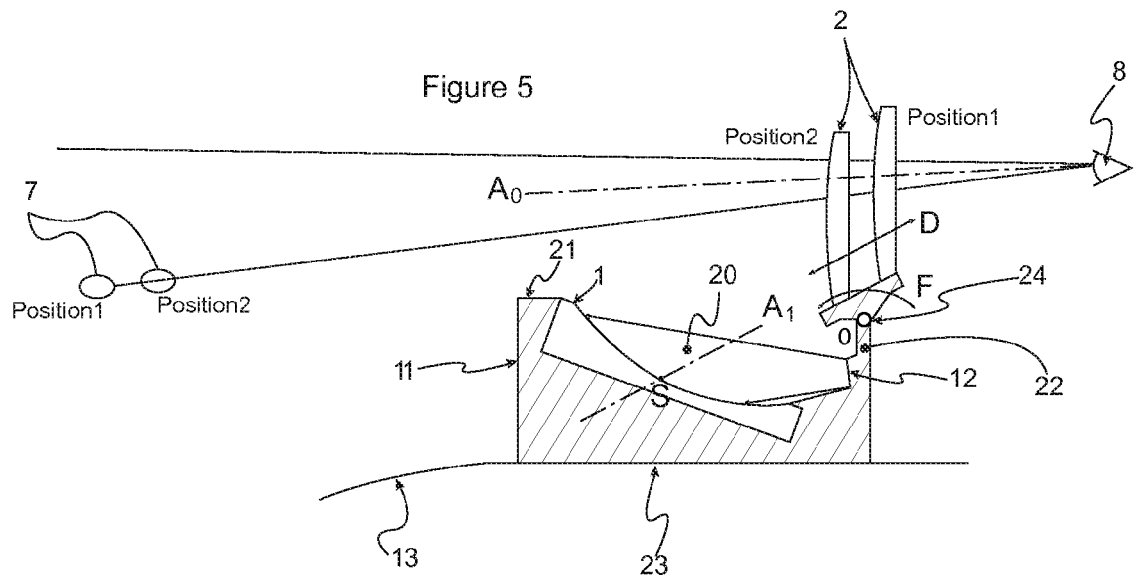
FIG. 5 shows, in this second version, the performance of an adjustment of the second optical component permitting variation of the distance of the final virtual image relative to the driver.

This equation shows that moving the component (2) closer to the component (1), along the axis D of FIG. 5 in fact causes the final virtual image (7) to be moved closer to the driver (8), and moving them apart causes the said image (7) to be moved away.

The examples illustrated by means of the figures above must not be considered as exhaustive of the invention, which encompasses variations of form for example for the support (11), its base (23), the hollow (20) as well as the rims (21, 22).

While this invention has been described in terms of the preferred embodiments thereof, it is not intended to be so limited, but rather only to the extent set forth in the claims that follow.

The invention claimed is:

1. An independent optical unit for head-up display system for motor vehicle configured to display in a field of view of a driver a final virtual image arising from an object image originating from a projector, said unit comprising:
    a first optical component configured to reflect an incident light ray emanating from the projector towards the field of view of the driver;
    a second optical component placed in the field of view of the driver and intersecting with the light ray reflected by the first optical component for the positioning of the final virtual image; and
    an adjustment means configured to facilitate adjustment of a second position of the second optical element relative to a first position of the first optical element, wherein
    the first optical component is configured to enlarge the object image and increase a depth of field of the object image, and
    the second optical component is configured to orient the final virtual image in a vertical plane in the field of view, the second optical component being made of a transparent material characterized as having a lenticular shape of which the face on the side of the second optical component toward the driver is flat and includes a diffraction grating for positioning the final virtual image, said diffraction grating comprising at least one set of straight lines that are parallel and equidistant having a pitch between 0.4 micrometers (μm) and 1 μm, a ratio of a width of the line over the pitch between 0.3 and 0.6, such that the final virtual image is positioned in the vertical plane without producing for the driver a deformation of the exterior scene visible through the second optical component, the said lenticular shape and the diffraction grating being designed to not deform the exterior scene visible to the driver through the second optical component.

2. The unit described in claim 1, wherein the second optical component presents, on its face opposite to the driver, a surface configured with a curvature designed to produce an additional enlargement of the object image, the radius of curvature being sufficiently large to not deform the exterior scene visible to the driver through the second optical component.

3. The unit described in claim 2, wherein the face opposite to the driver includes a convexity presenting a radius of curvature greater than 5 m.

4. The unit described in claim 1, wherein the first optical component is a reflector, the surface of which that is oriented to receive the incident light ray coming from the projector is concave.

5. The unit described in claim 4, wherein the concave surface includes superimposed selective reflection layers having indices of refraction selectively reflecting the wavelength or wavelengths of the light beam with well determined polarization coming from the projector, wherein the projector includes at least one light source emitting light, said light source comprising at least one of a monochromatic laser source and a light emitting diode.

6. The unit described in claim 5, wherein the concave surface includes a reflection layer.

7. The unit described in claim 1, wherein the adjustment means for adjustment of the relative position of the two optical components allow a pivoting of an axis of the second optical component (2) relative to the first optical component about an axis perpendicular to a plane containing a first axis of the first optical component and a second axis of the second optical component.

8. The unit described in claim 1, wherein the adjustment means for adjustment of the relative position of the two components allow a translatory displacement of the second optical component in a direction parallel with the first optical axis of the first optical component.

9. The unit described in claim 1, wherein the unit includes a support able to be inserted on or in the vicinity of a vehicle dashboard, the first and second optical components being arranged on the support, and the adjustment means allowing modification of the relative position of at least one of the two optical components relative to the support.

10. A head-up display system comprising the optical unit as described in claim 1, and a projection device which is so arranged that the light rays of its display are emitted towards the first optical component.

11. The head-up display system as described in claim 10, said system further comprising the unit as described in claim 9, wherein the second optical component (2) extends in a plane generally at right-angles to the direction of an axis of the field of view of the driver, at one end of the support situated on the side of the driver, and by the fact that the projection device is arranged on the support, between the first and the second optical components.

12. The head-up display system as described in claim 11, wherein the projection device is arranged under the second optical component.

\* \* \* \* \*